United States Patent
Glass et al.

[15] 3,690,021
[45] Sept. 12, 1972

[54] TOY CLOCK
[72] Inventors: Marvin I. Glass, Chicago; Leonid Kripak, Villa Park, both of Ill.
[73] Assignee: Marvin Glass & Associates
[22] Filed: April 20, 1971
[21] Appl. No.: 135,554

[52] U.S. Cl. .................................. 35/39, 58/106
[51] Int. Cl. ............................................ G09b 19/12
[58] Field of Search ........................... 35/39; 58/106

[56] References Cited

UNITED STATES PATENTS 2,539,025  1/1951  Lobb .......................... 35/39 X
2,631,386  3/1953  Zalkind ........................ 35/39
3,295,312  1/1967  Nutting ...................... 35/39 X

*Primary Examiner*—Harland S. Skogquist
*Attorney*—J. R. Sweeney, J. R. Stapleton, William R. McNair and J. R. Hoffman

[57] ABSTRACT

A toy clock intended for use by pre-school children, including a simulated clock face and simulated hands, and characterized by the provision of mechanism for producing repetitive audible signals corresponding to a time set on the face of the clock.

10 Claims, 5 Drawing Figures

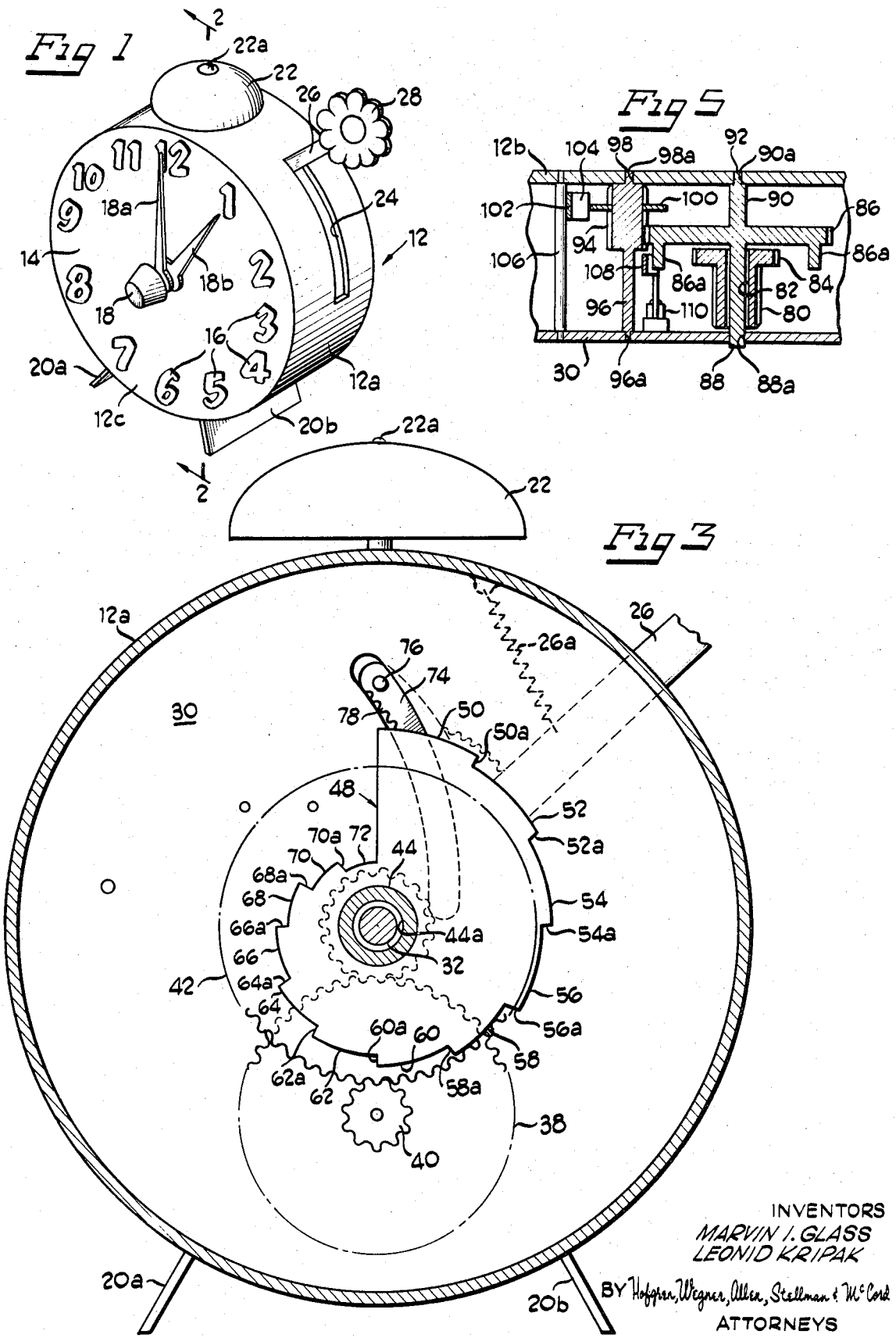

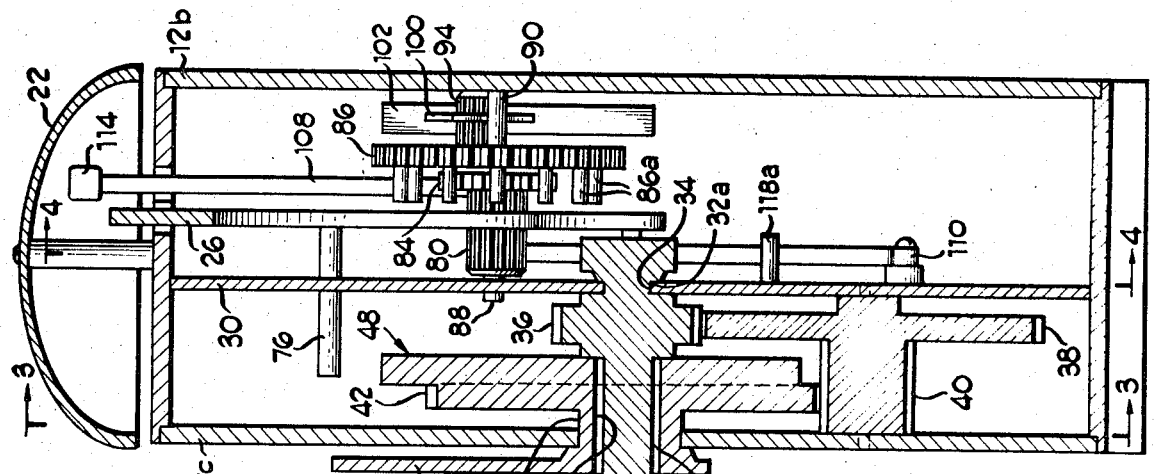
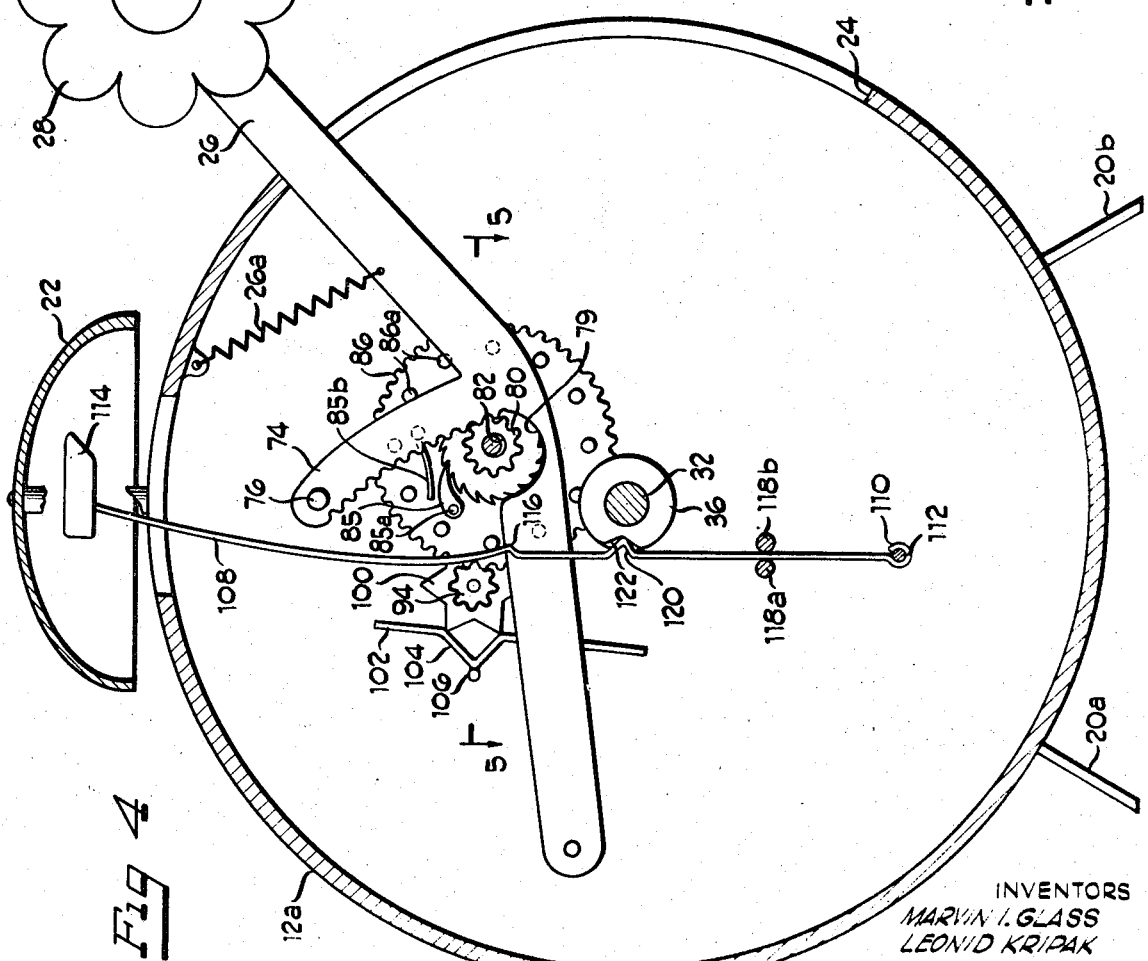

TOY CLOCK

BACKGROUND OF THE INVENTION

1. Field of the Invention

This invention relates to children's toys, and more particularly, to a toy clock.

BRIEF DESCRIPTION OF THE PRIOR ART

In the art of children's toys which serve as learning devices, there are different varieties of toy clocks. Some merely consist of simulated clock faces with movable hands which may be set to a simulated time. Others may be more sophisticated and include mechanism which may be associated with a sound producing means. In as much as learning to tell time involves the recognition of numerals and the relative location of two different pointer elements or "hands," this has often at times proved troublesome for preschool children. Accordingly, it is an object of this invention to provide an improved children's toy clock, which utilizes both sound and sight senses to recognize pre-set simulated time.

SUMMARY OF THE INVENTION

This invention is directed, in brief, to the provision of an improved children's simulated clock.

The best mode currently contemplated for carrying out the invention includes the provision of a clock housing including a face and movable hand elements. The hands are associated with gear mechanism for setting a cam member to a position related to the hour represented by the setting of the hands. The clock further includes an actuating lever having a follower for tracking on the cam. The lever is normally urged to a returned position and has a gear means associated with an escape mechanism for actuating the escapement as the lever returns from its set position while following on the cam. The escapement mechanism includes a member which serially moves a bell striker as the follower tracks on the cam to produce a repeated audible signal corresponding in number to the hour represented by the setting of the hands on the clock.

BRIEF DESCRIPTION OF THE DRAWINGS

FIG. 1 is a perspective view of the toy clock of this invention;

FIG. 2 is a section view taken generally along the line 2—2 of FIG. 1,

FIG. 3 is a section view taken generally along the line 3—3 of FIG. 2;

FIG. 4 is a section view taken generally along the line 4—4 of FIG. 2; and

FIG. 5 is a fragmentary sectional view of a portion of the follower and escapement mechanism of the toy clock of this invention.

While this invention is susceptible of embodiment in many different forms, there is shown in the drawings and will herein be described in detail a specific embodiment therefor, with the understanding that the present disclosure is to be considered as an exemplification of the principles of the invention and is not intended to limit the invention to the embodiment illustrated.

BRIEF DESCRIPTION OF THE PREFERRED EMBODIMENT

The clock 10 of this invention includes a housing generally indicated 12, including a cylindrical side wall 12a, a rear wall 12b and a front wall 12c, which preferably has a clock face representation 14 thereon. Included in the clock face representation are the numerals 16 indicating the 12 hours of the day. The clock 10 further includes a knob 18 associated with hands 18a and 18b, one of the hands 18a, being fixed with the knob 18 for movement therewith, and the other hand 18b being associated with the knob 18 for movement responsive to rotation of the knob 18. Legs 20a and 20b depend from the clock for supporting the same and a sound producing element, such as the bell 22, is affixed to the top of the clock by a suitable fastener 22a.

An elongated slot 24 is provided in the side wall 12a and a lever 26 extends therethrough having a decorative portion 28 at the end thereof. As seen in FIG. 2 in the interior of the clock intermediate the rear wall 12b and front wall 12c, there is an intermediate wall 30 provided for additional support of functional components.

The knob 18 is connected with knob shaft 32 which has a reduced portion 32a received in opening 34 in intermediate wall 30 for rotatably mounting the knob 18 with respect to the clock. The shaft 32 includes a geared peripheral portion 36 which is in mesh with gear 38 associated with reduced gear 40 rotatably positioned between the front wall 12c and the intermediate wall 30. Reduced gear 40 is in meash with gear 42 that is part of a hub 44 having a hollow cylindrical interior 44a which is telescopically associated with the knob shaft 32. The hub 44 has a radial enlargement to the exterior of the front wall 12c, which radial enlargement comprises the hand 18b. Therefore, as the knob 18 is turned to rotate the hand 18a, the hand 18b is also rotated indirectly through the aforementioned gear mechanism.

A cam 48 having a stepped exterior is also an integral part of the hub 44 and turns responsive to the rotation of knob 18 through the aforementioned associated gearing. The stepped periphery of the cam 48 is generally in a helical pattern of 12 segments 50, 52, 54, 56, 58, 60, 62, 64, 66, 68, 70 and 72 separated by eleven shoulders 50a, 52a, 54a, 56a, 58a, 60a, 62a, 64a, 66a, 68a, and 70a, respectively.

The lever 26 includes a transverse arm 74 having a protruding follower pin 76 on the free end thereof which is in a position to engage the stepped periphery of the cam 48 and thereby limit downward movement of lever 26 relative to slot 24. The arm 74 includes a toothed edge 78 providing a rack which is in meshing engagement with pinion 80. Lever 26 also has an arcuate recess 79 which generally underlies pinion 80. Pinion 80 has a hollow bore 82 and an associated ratchet 84 which is engagement with a pawl 85 mounted on a pin 85a protruding from gear 86. A spring 85b is positioned above the pawl 85 to insure that the pawl 85 returns in engagement with the ratchet 84 during the rotation of the ratchet 84.

The mechanism further includes a gear 86 having twelve equally spaced pins 86a protruding from one face thereof. In addition, the gear has a forward stub shaft 88 which extends through opening 88a in the wall 30 and a rear stub shaft 90 which extends through opening 90a in rear wall 12b and preferably has a reduced end portion 92 occupying the opening 90a for rotatably mounting the gear 86 with respect to the housing. In addition, the pinion 80 and ratchet 84 are rotatably mounted about the forward stub 88 by means of the hollow bore 82.

Gear 86 is in meshing engagement with a laterally adjacent pinion 94 having a forward stub shaft 96 received in opening 96a of front wall 30 and a rear stub shaft 98 received in opening 98a of rear wall 12b to rotatably mount the pinion 94 with respect to the housing. Pinion 94 supports a star 100 which is engagement with an escapement leaf 102 and particularly, in the area of a triangular offset 104 therein. Escapement 102 is connected with pin 106 to maintain the escapement in position in the interior of the housing.

The clock of this invention is further provided with an elongate leaf-like hammer spring 108 having one end 110 mounted on a pin 112 near the bottom of the interior of the housing with a hammer 114 at the opposite end in the interior of the bell 22. The hammer spring 108 includes an offset 116 in a position to be engaged by the pins 86a of gear 86 as gear 86 rotates. Supporting pins 118a and 118b closely straddle the spring 108 on either side thereof to help support the spring within the interior of the housing.

Shaft 32 includes an enlargement 121 having a notch 122 in one portion of the periphery thereof. The notch 122 is of a size and shape to receive the offset 120 in spring 108 which is laterally adjacent the enlargement 121. The enlargement 121 and shaft 32 are connected with the minute hand 18a so that the enlargement 121 rotates as the minute hand is turned. The notch 122 is located, relative to offset 120 so that the offset 120 may occupy the notch 122 when the minute hand is positioned at the number "12" on the clock face. This permits the spring 108 to move towards pins 86a so that, as the pins 86a move responsive to rotation of gear 86, they will be in a position to strike the offset 116 in spring 108 to thereby vibrate spring 108 which, in turn, will cause the hammer 114 to strike the interior of the bell 22.

DESCRIPTION OF THE OPERATION

The user first rotates the knob 18 until the hands 18a and 18b are set to a time indicating a specific hour of the day. This also causes rotation of cam 48 so that a number of segments thereof corresponding to the hour of the day, are displaced from the starting position of the cam. Next, the lever 26 is displaced by pulling it downwardly in slot 24, and the pin 76 engages the previously set hour cam surface. During this movement, pinion 80 and ratchet 84 are rotated by engagement of toothed edge 78 with pinion 80. The spring 26a continually urges the lever 26 upwardly or to a returned position. Toothed segment 78 of lever 26 pushes up against pinion 80 and thus ratchet 82 is pushed against pawl 85. This drives gear 86 through engagement with pawl 85 and gear 86 drives pinion 94 to rotate star 100 against escapement leaf 102. At the same time the protruding pins 86a of gear 86 strike hammer spring 108 in the area of the offset 116 to cause lateral displacement in the hammer spring 108 which, in turn, causes hammer 114 to strike against the interior of bell 22. This repeated striking occurs until the lever 26 returns to the fully retracted position relative to slot 24.

Thus, by means of the toy of this invention, a child may associate a number of audible signals with the numerical representation of the movable hand setting to facilitate learning the concept of telling time. The operation of the toy clock is extremely simple, requiring only the setting of the hands to a random hour following which the lever is depressed and the audible signals begin and terminate automatically.

The foregoing detailed description has been given for clearness of understanding only, and no unnecessary limitations should be understood therefrom, as some modifications may be obvious to those skilled in the art.

The embodiments of the invention in which an exclusive property or privilege is claimed are defined as follows:

1. A children's toy clock, comprising: means defining a housing including a simulated clock face with hour representative indicia thereon and an audible signal producing means associated with said housing; clock hands movably associated with said clock face; means for moving said clock hands; an actuating member mounted for movement from a retracted position to positions spaced away therefrom, and having a stop member engaging portion for limiting the amount of movement away from said retracted position: a stop member in the path of travel of the stop member engaging portion and movable toward and away therefrom responsive to movement of said clock hands; means for intermittent operation of said signal producing means, said intermittent actuating means being connected to said actuating member for movement thereof responsive to movement of said actuating member; and means for normally urging said actuating member to said retracted position following movement away therefrom to intermittently operate said signal producing means through movement of said intermittent operating means.

2. The toy clock of claim 1 wherein escapement means is mounted in said housing and operably associated with said means for intermittent operation of said audible signal producing means.

3. The toy clock of claim 1 wherein said stop member has different stop portions thereon for limiting the movement of said actuating member at different positions.

4. The toy clock of claim 1 wherein one hand is directly movable with said means for moving the clock hands and the other hand is indirectly movable responsive to movement of said means for moving said clock hands.

5. The toy clock of claim 1 wherein said audible signal means includes a hammer-like member mounted on a stem which is positioned for intermittent engagement by said intermittent signal producing means during movement thereof to intermittently move said hammer-like member.

6. The toy clock of claim 5 wherein the intermittent operating means has spaced protrusions thereon positioned to engage said hammer stem as said actuating member returns to said retracted position.

7. The toy clock of claim 6 wherein said toy clock includes escapement means operably connected with said intermittent actuation means.

8. The toy clock of claim 3 wherein said stop member is movably mounted in said housing for movement responsive to movement of said means for moving said clock hands to present different stop portions in the path of travel of the actuating member stop member engaging portion as said clock hands are moved to different settings relative to the clock face.

9. The toy clock of claim 6 wherein said stem has a first portion for engaging the protrusion of said operating means.

10. The toy clock of claim 9 wherein the stem has a second indexing portion and wherein an indexing member is associated with one of said clock hands for indexing engagement with said indexing portion in a preselected portion of said hand for positioning said first portion for engagement with the protrusions of said operating means.

* * * * *